United States Patent [19]

Hornbaker et al.

[11] 4,198,381

[45] Apr. 15, 1980

[54] PROCESS FOR PREPARING LOW MOLECULAR WEIGHT LINEAR PHOSPHONITRILIC CHLORIDE OLIGOMERS

[75] Inventors: Edwin D. Hornbaker; Hsueh M. Li, both of Baton Rouge, La.

[73] Assignee: Ethyl Corporation, Richmond, Va.

[21] Appl. No.: 935,629

[22] Filed: Aug. 21, 1978

[51] Int. Cl.² ............................................. C01B 25/10
[52] U.S. Cl. ..................................................... 423/300
[58] Field of Search ........................................ 423/300

[56] References Cited

U.S. PATENT DOCUMENTS

| | | | |
|---|---|---|---|
| 1,914,750 | 6/1933 | Marsh | 423/300 |
| 3,359,080 | 12/1967 | Ridgway et al. | 423/300 |
| 3,656,916 | 4/1972 | Schiedermaier et al. | 423/300 |
| 3,669,633 | 6/1972 | Beinfest et al. | 423/300 |
| 3,780,162 | 12/1973 | Bergeron et al. | 423/300 |
| 3,860,693 | 1/1975 | Graham | 423/300 |

Primary Examiner—Delbert E. Gantz
Assistant Examiner—Wayne A. Langel
Attorney, Agent, or Firm—Donald L. Johnson; John F. Sieberth; Frederick A. Stolzle, Jr.

[57] ABSTRACT

In the first step of a two step process, $PCl_3$ and $Cl_2$ are reacted in a suitable medium. In the second step, $PCl_3$, $Cl_2$ and $NH_3$ are concurrently fed into said medium while keeping the temperature at 100° C. to 140° C. The feeds of the reactants are controlled so that until the first ½ of the $NH_3$ has been reacted the molar ratio of $PCl_3:NH_3$ (including the $PCl_3$ of the first step) is kept above 2. Thereafter, the feeds are adjusted so that with respect to the total amount of ammonia, said molar ratio is between 1.2 and 1.5. Linear phosphonitrilic chloride oligomers having a number average degree of polymerization from 2 to 9 are produced in high yield.

8 Claims, 1 Drawing Figure

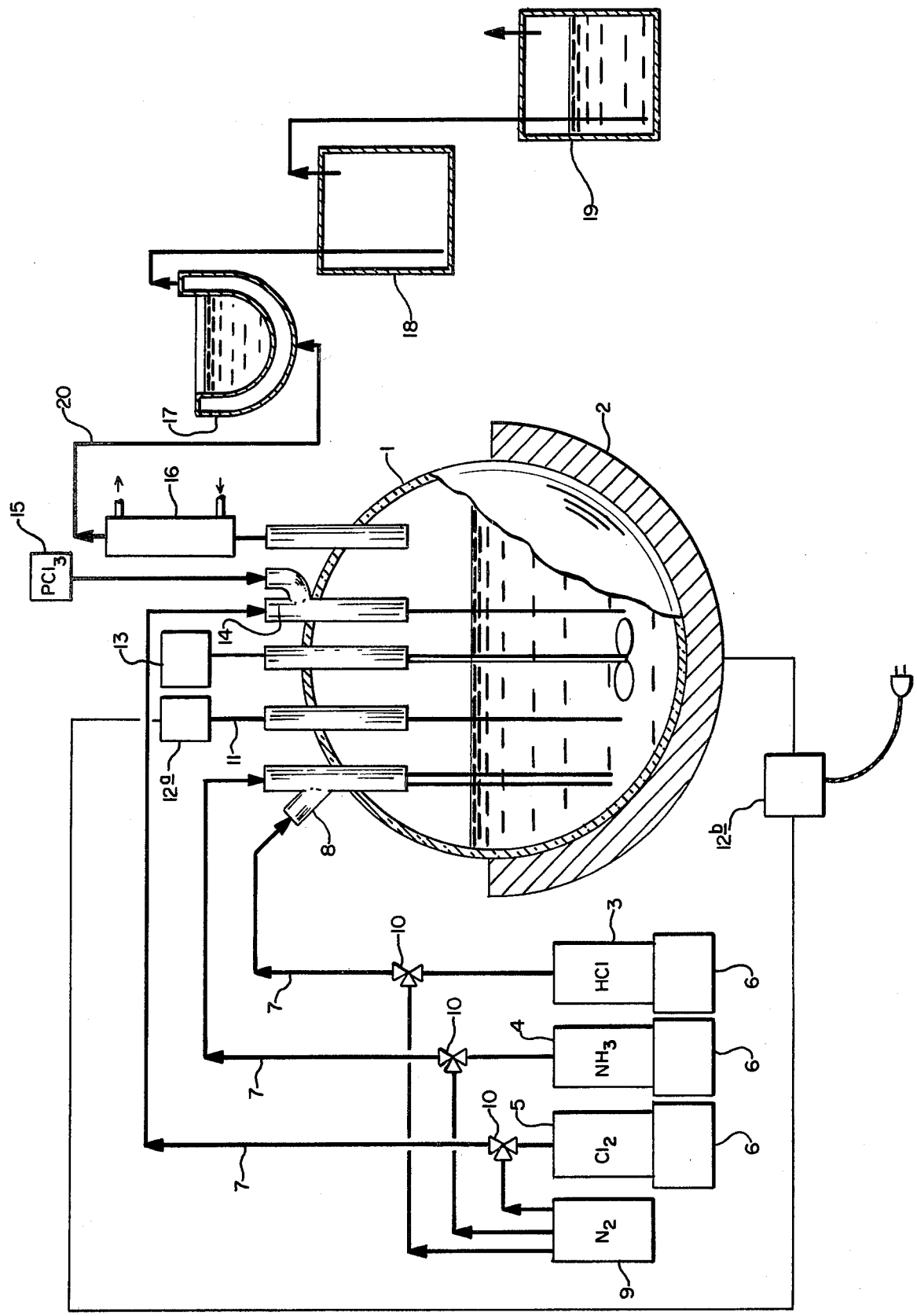

PROCESS FOR PREPARING LOW MOLECULAR WEIGHT LINEAR PHOSPHONITRILIC CHLORIDE OLIGOMERS

BACKGROUND OF THE INVENTION

Much work has been done and is reported in the prior art on processes for making linear and cyclic phosphonitrilic chloride oligomers from ammonia and ammonium derivatives and phosphorus chlorides.

Methods for the preparation of the cyclic species especially the trimer and tetramer are the focal point of recent investigation. Representative prior art processes are described, for example in U.S. Pat. No. 3,359,080 issued Dec. 19, 1967 to Ridgeway et al wherein elemental chlorine, $PCl_3$ and $NH_4Cl$ are reacted in an inert solvent; U.S. Pat. No. 3,367,750 issued Feb. 6, 1968 to Jaszka et al wherein use of ammonium chloride of ultrafine particle size (e.g., less than 5 microns) with phosphorus pentachloride is taught to produce a higher percentage of cyclic oligomers in the reaction product than larger particles of ammonium chloride; U.S. Pat. No. 3,462,247 issued Aug. 19, 1969 to Paddock et al wherein a metallic salt is used to catalyze the $PCl_5$-$NH_4Cl$ reaction; U.S. Pat. No. 3,656,916 to Schiedermier et al issued Apr. 18, 1972 wherein $PCl_5$ and $NH_3$ are reacted in an inert solvent, the ammonia being added under controlled rates of addition, and U.S. Pat. No. 3,780,162 issued Dec. 18, 1973 to Bergeron et al wherein ammonia and $PCl_5$ are reacted under pressure in the presence of hydrogen chloride. Belgium Pat. No. 845,952 published Mar. 8, 1977 discloses a method for the preparation of cyclic oligomers by simultaneously introducing phosphorus trichloride, chlorine and ammonia into a stirred solvent such that the rate of phosphorus trichloride addition does not exceed the stoichiometric ratio with respect to the ammonia and chlorine introduced.

Much early work concerns preparation of linear oligomers, for example by the reaction of phosphorus pentachloride and ammonium chloride, and is described by Allcock in his book *Phosphorus-Nitrogen Compounds*, Academic Press, New York (1972), 110 et. seq. See also M. Becke-Goehring and E. Fluck, *Agnew. Chem.*, 74, 382 (1962), and Paddock et al, *Advances in Inorganic Chemistry and Radiochemistry*, Academic Press, New York (1959), Volume 1, 351–53, 359–601. These processes generally require reacting solid ammonium chloride and solid phosphorus pentachloride in certain proportions in a suitable solvent and for a relatively long time, for example 30 to 40 hours or more. Accordingly there still remains a need for a process which enables the preparation of low molecular weight phosphonitrilic halide oligomers in high yield within a relatively short time. Such a process is provided by the present invention.

BRIEF DESCRIPTION OF THE DRAWING

The FIGURE is a schematic diagram of the apparatus used in Example 1-4.

THE INVENTION

In accord with the present invention there is provided a method for the preparation of phosphonitrilic chloride mixtures containing a high proportion of linear oligomers, said process comprising initially introducing phosphorus trichloride and chlorine into a substantially anhydrous, inert liquid reaction medium and then introducing phosphorus trichloride, chlorine and ammonia concurrently into said reaction medium while maintaining said medium at a temperature within the range of from about 100° C. to about 140° C., the rate at which the phosphorus trichloride, chlorine and ammonia are introduced being regulated such that: (i) the molar ratio of phosphorus trichloride to chlorine introduced initially is approximately one, (ii) with respect to the first half of the total amount of ammonia being used, the average molar ratio of phosphorus trichloride to ammonia including the phosphorus trichloride added in the initial step is kept above 2, and (iii) with respect to the total amount of ammonia being used, the average molar ratio of phosphorus trichloride to ammonia including the phosphorus trichloride added in the initial step is within the range of from about 1.2 to about 1.5.

In a preferred embodiment of this invention hydrogen chloride is introduced into the reaction medium in an amount sufficient to at least saturate the reaction medium with HCl prior to the introduction of the ammonia into the medium. Optionally, a partially saturated solution may be formed and the balance of the HCl may then be introduced concurrently with the initial quantities of ammonia. Most preferably, the molar ratio of HCl to $NH_3$ used is within the range of from about 0.01:1 to 0.3:1.

Among the advantages of this invention is the production of linear phosphonitrilic chloride oligomers having a degree of polymerization falling in the range of from 2 to about 9 in good yield and in relatively short reaction periods. For example, yields of 76 to 88 percent have been obtained during reaction periods of 6-10 hours. In addition this invention provides a process wherein the feed rates of the reactants are easily and conveniently controlled and wherein waste due to unreacted raw materials is minimized. Furthermore since the reactants in the process of this invention are either liquid or gaseous, problems associated with solid reactants, e.g., caking, solvating, and regulation of particle size, are eliminated. Other advantages will be apparent from the following description of the invention.

In conducting the process the chlorine and ammonia, and hydrogen chloride if used, are fed to the system in the gaseous state. The $PCl_3$ may be fed either in gaseous form or as a liquid, preferably the latter. The inert reaction medium used in the process should preferably be a material which is capable of existing in the liquid state under atmospheric pressure at temperatures within the preferred range of about 100° C. to about 140° C. This enables the reaction to be conducted under reflux conditions at optimum reaction temperatures, a mode of operation which is particularly desirable. Furthermore, use of such low boiling reaction media facilitates the recovery of the desired product in that the reaction medium can be distilled or flashed from the oligomeric product at relatively low temperatures. Polar reaction media are particularly desirable. Accordingly, use may be made of appropriate halogenated hydrocarbons (preferably chlorinated hydrocarbons), and nitro-compounds.

Examples of suitable reaction media include monochlorobenzene, dichlorobenzenes, trichlorobenzenes, tetrachlorobenzenes, 1,1,2,2-tetrachloroethane, 1,1,2-trichloroethane, benzyl chloride, nitromethane, nitroethane and nitrobenzene. Particularly preferred is monochlorobenzene because of its boiling point, ease of separation from the product, low toxicity and low cost.

Mixtures of various materials which have a boiling point within the desired range and which are inert to the reactants and to the products formed may also be used in the practice of the invention.

In general, the process of the present invention is carried out in two steps which are performed sequentially. The first step involves introduction of certain amounts of PCl$_3$ and Cl$_2$ into the reaction medium in order to form a solution of PCl$_5$. Preferably, the first step also includes introduction of HCl into the reaction medium. The second step of the process entails introducing controlled proportions of PCl$_3$, Cl$_2$ and NH$_3$ concurrently into the medium formed from the first step, the medium being held within a desired temperature range. Optionally, HCl may also be added during the first part of this second step.

The first step is normally initiated by charging the reaction medium to the reactor and agitating the medium by conventional means such as by a stirrer. Phosphorus trichloride and chlorine are introduced into the agitated medium in order to form a solution of phosphorus pentachloride. Although not critical, generally the molar ratio of PCl$_3$ introduced into the reaction medium in the first step based on the total moles of NH$_3$ to be used in the second step is within the range of from about 0.05:1 to about 0.5:1. The molar ratio of the PCl$_3$ to Cl$_2$ introduced into the system in the first step is preferably approximately 1 and within the range of about 0.9 to about 1.1.

In a preferred aspect of the invention, immediately after the first step, the reaction medium is saturated with hydrogen chloride so that on contact with ammonia there is formed a finely divided dispersion of ammonium chloride. This dispersion is available to initiate the second step, i.e., the reaction of PCl$_3$, chlorine and ammonia to produce the product.

The first step may be performed in the same reactor to be used for the second step, or optionally, the PCl$_5$ solution may be transferred to another reactor in which the second step is performed. By forming the solution of PCl$_5$ in situ from chlorine and PCl$_3$, the necessity of handling and feeding the hygroscopic, corrosive and readily hydrolyzable solid PCl$_5$ is avoided. Furthermore, higher temperatures are needed to dissolve solid PCl$_5$ than are required to form the PCl$_5$ in situ. Accordingly, in the process of this invention energy requirements are kept to a minimum.

During or after the formation of the PCl$_5$ solution, its temperature is raised to about 100° C. to about 140° C. and the concurrent feed of the PCl$_3$, Cl$_2$ and NH$_3$ to the heated solution is initiated. Reaction temperatures within the range of from about 115° C. to about 135° C. are particularly preferred. The feed rates of the phosphorus trichloride and ammonia are controlled so that until the first half of the ammonia has been fed and reacted, the molar ratio of PCl$_3$:NH$_3$ (including the PCl$_3$ of the first step) is kept above 2:1 at all times. Preferably this ratio is within the range of from about 2:1 to about 3:1. Thereafter the feeds of PCl$_3$ and NH$_3$ are adjusted so that with respect to the total amount of ammonia used, said molar ratio is between about 1.2:1 and about 1.5:1. The molar ratio of PCl$_3$ to Cl$_2$ introduced into the system is preferably approximately one at all times during the reaction, and should be less than one at the termination of reactant feeding. In order to satisfy the molar ratio requirements for the reactants introduced into the reaction medium, the rate of introduction of NH$_3$ into the system relative to the rate of introduction of PCl$_3$ is generally greater for the second half of the total of NH$_3$ being used than for the first half. The mode of addition does not appear to be critical since all reactants are fed substantially concurrently. Thus, the reactants can be added continuously or intermittently as long as the above indicated molar ratio of reactants is maintained. It has been found convenient to add the chlorine and ammonia to the reaction mixture below the liquid level in the reactor so that these gaseous reactants are not vented through the reflux condenser or reflux column with HCl formed during the reaction. The phosphorus trichloride can be added either above or below the liquid surface, as desired.

In a batch system the length of feeding will depend on a number of factors, such as the size and capacity of the reactor, the capability of the reflux condenser or column, heat transfer limitations, the size and capacity of the feeding system, and the like. Concurrent feed of reactants has been carried out for periods of about 5 to about 10 hours in relatively small equipment. Similar feed times or longer or shorter feeding periods can be used in larger scale equipment.

After the concurrent feed is discontinued reflux conditions can be maintained to complete the reaction and to allow the remaining HCl formed to be vented. The time during which reflux conditions are maintained is not critical as long as conditions and concentrations of reactants employed are sufficient to prevent further reaction and polymerization of the product. Preferably, after discontinuing the feeding of reactants the reaction mixture is maintained at reflux until hydrogen chloride evolution has ceased and for a period up to about 6 hours thereafter.

The process of the present invention produced phosphonitrilic chloride mixtures containing a high proportion of linear oligomers. Any means conventionally available to skilled practitioners can be used to recover the linear oligomers from the mixture. In general, the reaction mixture is cooled to ambient conditions, filtered to remove by-product ammonium chloride, and the solvent is removed from the product by evaporation, distillation, flashing or other similar means. The cyclic oligomer fraction may then be extracted with petroleum ether or other suitable solvents which are selective for the cyclic fraction. Alternatively, the cyclic fraction may be removed by distillation under reduced pressure subsequent to distillation or flashing of the solvent.

The product linear phosphonitrilic chloride mixture has the general formula

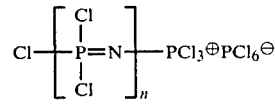

wherein the number average n is an integer from 2 to about 9. Upon isolation, the product may be solid or liquid depending on the average molecular weight of the polymers formed. If the molecular weight is low e.g., having a degree of polymerization between 2 and 5 the product is an amorphous solid. If the average molecular weight of the product is higher e.g., if n is from about 6 to about 9 the product is a yellowish liquid.

Referring now to the FIGURE which is a schematic diagram of the apparatus used in the following examples, a one liter, five-necked reaction flask was cradled in a heating mantle in order to regulate the temperature. The gaseous reactants, (HCl, NH$_3$ and Cl$_2$) were fed into the reaction medium from tanks 3, 4 and 5 respectively, which rested on platform balance 6. Tubes 7 (made from polytetrafluoroethylene) which extended below the surface of the reaction medium was used to transfer the gases from their respective tanks to said medium. The flow rates of the gases were controlled by regulating valves 10, which valves were also used to introduce nitrogen into the reactant tube lines in order to prevent back-flow of gas or liquid and clogging of the tubes. The tubes carrying HCl and NH$_3$ were secured in the reaction flask with a 105° side arm adapter 8 mounted atop the flask. The chlorine inlet tube was secured in the reaction flask through one orifice of a Claisen T Adapter 14. Mounted into the other orifice of the Claisen T Adapter was a graduated addition funnel 15 containing liquid PCl$_3$. The lower end of this adapter was above the liquid level of the reaction medium in order to allow drop-wise addition of PCl$_3$ to the medium. A thermometer 11 occupies one neck of the reaction flask, and fixed near the top of said thermometer was a Therm-o-Watch Control 12 which automatically controls reaction medium temperature by regulating the heating mantle. Another neck of the flask held a sealed mechanical stirrer 13, the stirring blades of which were below the liquid level. The remaining neck of the reaction flask supported an Allihn reflux condenser 16, the bottom of which was above the liquid level of the reaction medium. Secured atop this condenser was a Dewar Type dry ice condenser which contained a mixture of dry ice and acetone at about −70° C. This served to condense NH$_3$. The gas outlet tube 20 led from the Dewar condenser into a gas washing bottle 18. The gas washing bottle was further connected to a water bath which absorbed the noxious HCl gas.

EXAMPLE I 100 grams (0.73 moles) of PCl$_3$ and a slight molar excess of Cl$_2$ (approximately 0.75 moles) were introduced into 350 ml of monochlorobenzene at ambient temperature. The solution was then heated to 130° C. during which time 8 g of HCl were slowly bubbled into solution. After the reaction medium has been brought to 130° C., 53 g (3.12 moles) of NH$_3$, and additional 480 g (3.5 moles) of PCl$_3$, 255 g (3.6 moles) of Cl$_2$, and 150 ml of monochlorobenzene were added to the reaction medium in the increments indicated in Table I below. The monochlorobenzene was added through the Allihn reflux condenser at approximately 25 ml/hr in order to wash any solidified reactant or product (e.g., NH$_4$Cl) back into the reaction medium. The rates of NH$_3$, PCl$_3$, and Cl$_2$ were adjusted during the 6.5 hr reaction time so as to keep the ratio of PCl$_3$ to NH$_3$ greater than 2 until half of the required NH$_3$ has been added. During the later portions of the reaction period the flow rates of the reactants were adjusted so that the final molar ratio of PCl$_3$ to NH$_3$ (taking into consideration the total amount of NH$_3$ and PCl$_3$ added) was 1.36. The amounts of reactants fed into the medium were monitored approximately at ten minute intervals and the ratios calculated in order to keep the ratios within the limits of the invention. After all reactants had been added, the reaction medium was refluxed for one hour at 130° C. The reaction mixture was then cooled and filtered to remove unreacted ammonium chloride.

A 2 ml sample of the filtrate was taken and analyzed by P$^{31}$NMR. This analysis showed that the filtrate consisted of 76.3 equivalent % of low molecular linear phosphonitrilic oligomers and 23.7 equivalent % of cyclic (PNCl$_2$)$_{3-6}$ oligomers. The P$^{31}$NMR analysis also showed the linear oligomers to have the structure

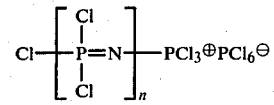

wherein the number average n=2–6.

The filtrate was then distilled under approximately 30 mm pressure at about 50° C. to remove the chlorobenzene. The cyclic phosphonitrilic chloride oligomeric mixture was then extracted with three 300 ml portions of petroleum ether at 40°–50° C. leaving a residue of hydrocarbon-insoluble, waxy, low molecular weight linear phosphonitrilic chloride oligomeric mixture weighing 432 g. Distillation of the petroleum ether from the cyclic mixture yielded 108 g of white crystalline by-product Table I shows the cumulative amount of each reactant introduced into the reaction medium after the end of hourly intervals and after 6.5 hours after which point all feeding of reactants was discontinued. Table I also shows the corresponding PCl$_3$:NH$_3$ ratios, as they existed during specified time periods during the reaction.

TABLE I

| Time (hrs) | PCl$_3$ (g) | Cl$_2$ (g) | NH$_3$ (g) | HCl (g) | Solvent (ml) | Molar Ratio of PCl$_3$/NH$_3$ |
|---|---|---|---|---|---|---|
| 1 | 100 | 52 | 0 | 0 | 350 | — |
| 2 | 204 | 99 | 8 | 8 | 375 | 3.16 |
| 3 | 322 | 148 | 15 | 8 | 400 | 2.66 |
| 4 | 406 | 208 | 28 | 8 | 425 | 1.79 |
| 5 | 520 | 250 | 40 | 8 | 475 | 1.61 |
| 6 | 580 | 304 | 50 | 8 | 500 | 1.44 |
| 6.5 | 580 | 304 | 53 | 8 | 500 | 1.36 |

6.5–7.5 hr refluxed at 130° C.

EXAMPLE II

Following the procedure of Example I, a total of 580 g of PCl$_3$, 303 g of Cl$_2$, 48 g of NH$_3$ and 7 g of HCl were added to a total of 500 ml of monochlorobenzene at a temperature of about 130° C. The addition of reactants over a period of approximately 6.5 hours was followed by one and one-half hours of refluxing at 130° C. After distillation of the solvent, analysis of the reaction product using P$^{31}$NMR revealed a linear fraction of 88.4 equivalent precent and a cyclic fraction of 11.56 equivalent percent. Table II shows the temporal feed rates for the reactants and the PCl$_3$/NH$_3$ ratios at selected times during the reaction.

TABLE II

| Time (hrs) | PCl$_3$ (g) | Cl$_2$ (g) | NH$_3$ (g) | HCl (g) | Solvent (ml) | Molar Ratio of PCl$_3$/NH$_3$ |
|---|---|---|---|---|---|---|
| 1 | 100 | 50 | 0 | 0 | 350 | — |
| 2 | 204 | 88 | 7 | 7 | 380 | 3.63 |
| 3 | 407 | 185 | 21 | 7 | 400 | 2.41 |
| 4 | 526 | 247 | 28 | 7 | 440 | 2.33 |
| 5 | 580 | 292 | 34 | 7 | 460 | 2.11 |
| 6 | 580 | 303 | 46 | 7 | 490 | 1.57 |
| 6.5 | 580 | 303 | 48 | 7 | 500 | 1.50 |

6.5–8 hr refluxed at 130° C.

EXAMPLE III

In this instance an experimental run at 120° C. following the procedure of Example I and using a total of 580 g PCl$_3$, 304 g of Cl$_2$, 53 g of NH$_3$ and 8 g of HCl in a total of 500 ml of monochlorobenzene was completed. The reactants were added over a period of 8.25 hours and the resulting medium was refluxed for 2.75 hours thereafter. After distillation of the solvent, analysis of the reaction product using P$^{31}$NMR revealed a linear fraction of 76.1 equivalent percent and a cyclic fraction of 23.9 equivalent percent. Table III tracks the progress of addition of the reactants.

TABLE III

| Time (hrs) | PCl$_3$ (g) | Cl$_2$ (g) | NH$_3$ (g) | HCl (g) | Solvent (ml) | Molar Ratio of PCl$_3$/NH$_3$ |
|---|---|---|---|---|---|---|
| 1 | 100 | 50 | 0 | 0 | 350 | — |
| 2 | 228 | 92 | 6 | 8 | 375 | 4.75 |
| 2.75 | 268 | 117 | 10 | 8 | 400 | 3.32 |
| 4 | 386 | 183 | 22 | 8 | 430 | 2.18 |
| 5 | 503 | 235 | 30 | 8 | 440 | 2.09 |
| 6 | 580 | 261 | 35 | 8 | 470 | 2.06 |
| 7 | 580 | 301 | 41.5 | 8 | 480 | 1.73 |
| 8.25 | 580 | 304 | 53 | 8 | 500 | 1.36 |

8.25–11 hr refluxed at 120° C.

EXAMPLE IV

In this example, a laboratory run was conducted in the absence of hydrogen chloride. The procedure of Example I was followed at 130° C. using a total of 580 g of PCl$_3$, 302 g of Cl$_2$ and 53 g of NH$_3$. As indicated in Table IV, the reactants were commingled in the tabulated amounts for 6.5 hours, and then refluxed at 130° C. for one hour. Analysis of the reaction product using P$^{31}$NMR revealed a linear fraction of 73.4 equivalent percent and a cyclic fraction of 26.6 equivalent percent.

TABLE IV

| Time (hrs) | PCl$_3$ (g) | Cl$_2$ (g) | NH$_3$ (g) | Solvent (ml) | Molar Ratio of PCl$_3$/NH$_3$ |
|---|---|---|---|---|---|
| 1 | 100 | 50 | 0 | 350 | — |
| 2 | 204 | 102 | 9 | 370 | 2.81 |
| 3 | 317 | 147 | 18 | 400 | 2.18 |
| 4 | 423 | 201 | 28 | 425 | 1.87 |
| 5 | 540 | 260 | 37 | 450 | 1.87 |
| 6 | 580 | 302 | 47 | 475 | 1.53 |
| 6.5 | 580 | 302 | 53 | 500 | 1.36 |

6.5–7.5 hr. refluxed at 130° C.

The linear phosphonitrilic chloride oligomers prepared by the process of the present invention are useful as precursors for the preparation of longer chain phosphonitrilic chloride polymers which are in turn useful intermediates for the preparation of substituted phosphazene polymers such as described in copending Application Ser. No. 956,227 filed Oct. 30, 1978. Alternatively, the longer chain phosphonitrilic chloride polymers prepared from the linear oligomers of the instant invention may be substituted with aryloxy and alkoxy groups to form substituted polymers useful as hydraulic fluids and lubricants. While the process of the present invention enables the preparation of phosphonitrilic chloride oligomers it is to be understood that this process is also applicable to the formation of phosphonitrilic bromide oligomers.

Other modifications and variations of the present invention will now be readily apparent in light of the above teachings. It is therefore to be understood that changes may be made in the particular embodiments described above which are within the spirit and intended scope of the invention as defined in the appended claims.

What is claimed is:

1. A method for the preparation of phosphonitrilic chloride mixture containing a high proportion of linear oligomers which comprises
    (a) introducing phosphorus trichloride and chlorine into a substantially anhydrous, inert liquid reaction medium, and then
    (b) introducing phosphorus trichloride, chlorine and ammonia concurrently into said reaction medium while maintaining said medium at a temperature within the range of from about 100° C. to about 140° C., the rates at which the phosphorus trichloride, chlorine and ammonia are introduced being regulated such that:
        (i) the molar ratio of phosphorus, trichloride to chlorine introduced during (a) is from 0.9 to 1.1, and
        (ii) with respect to the first half of the total amount of ammonia being used, the average molar ratio of phosphorus trichloride to ammonia including the phosphorus trichloride of (a) is kept above two, and
        (iii) with respect to the total amount of ammonia being used, the average molar ratio of phosphorus trichloride to ammonia including the phosphorus trichloride of (a) is within the range of from about 1.2 to about 1.5.

2. The method of claim 1 further characterized by the addition of an amount of hydrogen chloride sufficient to saturate said medium.

3. The method of claim 2 wherein the molar amount of hydrogen chloride is from 0.01 to 0.3 mole per mole of ammonia used.

4. The method of claim 1 wherein the reaction medium is maintained at reflux during the introduction of said ammonia into said medium.

5. The method of claim 1 wherein the temperature is within the range of from about 115° C. to about 135° C.

6. The method of claim 1 wherein said reaction medium is a halogenated hydrocarbon having a boiling point in the range of from about 100° C. to about 150° C.

7. The method of claim 1 wherein said reaction medium is a chlorinated benzene.

8. The method of claim 1 wherein said reaction medium is monochlorobenzene.

* * * * *